US012694485B2

(12) United States Patent
Chen

(10) Patent No.: US 12,694,485 B2
(45) Date of Patent: Jul. 28, 2026

(54) VIDEO PROCESSING METHOD AND APPARATUS, AND DEVICE AND MEDIUM

(71) Applicant: Beijing Zitiao Network Technology Co., Ltd., Beijing (CN)

(72) Inventor: Lushuang Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/858,292

(22) PCT Filed: Jun. 21, 2023

(86) PCT No.: PCT/CN2023/101608
§ 371 (c)(1),
(2) Date: Oct. 18, 2024

(87) PCT Pub. No.: WO2023/246844
PCT Pub. Date: Dec. 28, 2023

(65) Prior Publication Data
US 2025/0272800 A1      Aug. 28, 2025

(30) Foreign Application Priority Data
Jun. 21, 2022    (CN) ......................... 202210705983.3

(51) Int. Cl.
G11B 27/031 (2006.01)
G06T 5/50 (2006.01)
(Continued)

(52) U.S. Cl.
CPC ................. G06T 5/70 (2024.01); G06T 5/50 (2013.01); G06T 7/11 (2017.01); G06T 7/194 (2017.01);
(Continued)

(58) Field of Classification Search
CPC ... G06T 5/70; G06T 7/194; G06T 7/11; G06T 5/50; G06V 10/25; G06V 20/49; G11B 27/031
See application file for complete search history.

(56) References Cited

U.S. PATENT DOCUMENTS

2010/0053342 A1*    3/2010   Hwang ................... H04N 23/58
                                                    348/207.99
2016/0205291 A1     7/2016   Narahari et al.
(Continued)

FOREIGN PATENT DOCUMENTS

CN        111292337 A      6/2020
CN        113313788 A      8/2021
(Continued)

OTHER PUBLICATIONS

International Search Report and Written Opinion for PCT/CN2023/101608, mailed on Oct. 16, 2023, 14 pages.
(Continued)

*Primary Examiner* — Mishawn N. Hunter
(74) *Attorney, Agent, or Firm* — Astute IP Law Group

(57) ABSTRACT
A video processing method includes: obtaining a plurality of image groups on the basis of a video frame sequence of an initial video; performing motion blur processing on the basis of each frame of image in a target image group, and fusing images which are obtained by performing motion blur processing on each frame of image, so as to obtain a motion-blurred image corresponding to the target image group; on the basis of a specified frame of image in the target image group, determining a main body object area and a background area, which correspond to the target image group; fusing the motion-blurred image with the specified frame of image according to the main body object area and the background area, so as to obtain a target fused image; and generating a target video on the basis of target fused images respectively corresponding to the plurality of image groups.

17 Claims, 2 Drawing Sheets

Obtaining a plurality of image groups based on a video frame sequence of an initial video — S102

Performing motion blur processing based on respective frames of images in a target image group and merging images which are obtained by performing motion blur processing on the respective frames of images, so as to obtain a motion-blurred image corresponding to the target image group, wherein each image group among the plurality of image groups is the target image group — S104

Determining a main object area and a background area which correspond to the target image group based on a specified frame of image in the target image group — S106

Merging the motion-blurred image and the specified frame of image according to the main object area and the background area so as to obtain a target merged image — S108

Generating a target video based on the target merged images respectively corresponding to the plurality of image groups — S110

(51) Int. Cl.

| | |
|---|---|
| *G06T 5/70* | (2024.01) |
| *G06T 7/11* | (2017.01) |
| *G06T 7/194* | (2017.01) |
| *G06V 10/25* | (2022.01) |
| *G06V 20/40* | (2022.01) |

(52) U.S. Cl.
CPC .............. *G06V 10/25* (2022.01); *G06V 20/49* (2022.01); *G11B 27/031* (2013.01); *G06T 2207/10016* (2013.01); *G06T 2207/20216* (2013.01); *G06T 2207/20221* (2013.01)

(56) References Cited

U.S. PATENT DOCUMENTS

| | | | |
|---|---|---|---|
| 2019/0213712 | A1 | 7/2019 | Shoa Hassani Lashdan et al. |
| 2022/0262008 | A1* | 8/2022 | Kidd ..................... G06F 18/214 |

FOREIGN PATENT DOCUMENTS

| | | | |
|---|---|---|---|
| CN | 113673474 | A | 11/2021 |
| CN | 114245035 | A | 3/2022 |
| CN | 114419073 | A | 4/2022 |
| JP | 2018-160235 | A | 10/2018 |

OTHER PUBLICATIONS

Decision to Grant received for Japanese Patent Application No. 2024-561603, mailed on Sep. 30, 2025, 6 pages (3 pages of English Translation and 3 pages of Original Document).

Extended European Search Report received for European Application No. 23826489.9, mailed on Apr. 29, 2026, 11 pages.

Kroeger et al., "Fast Optical Flow Using Dense Inverse Search", ECCV 2016, P art IV, LNCS, vol. 9908, 2016, pp 471-488.

Mikamo et al., "A method for adding motion-blur on arbitrary objects by using auto-segmentation and color compensation techniques", arXiv:2109.10524v1 [cs.CV], Sep. 22, 2021, 5 pages.

* cited by examiner

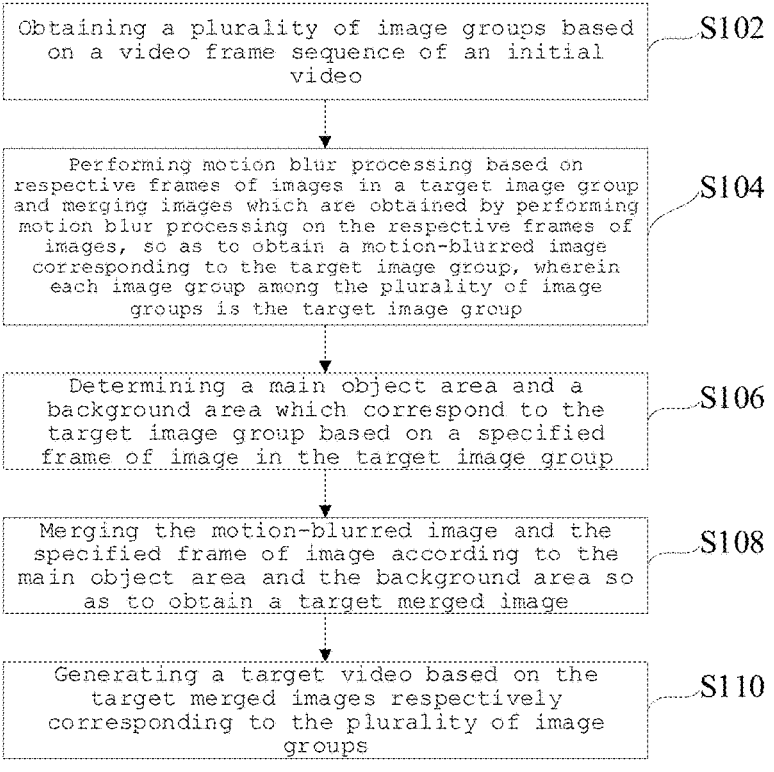

Obtaining a plurality of image groups based on a video frame sequence of an initial video — S102

Performing motion blur processing based on respective frames of images in a target image group and merging images which are obtained by performing motion blur processing on the respective frames of images, so as to obtain a motion-blurred image corresponding to the target image group, wherein each image group among the plurality of image groups is the target image group — S104

Determining a main object area and a background area which correspond to the target image group based on a specified frame of image in the target image group — S106

Merging the motion-blurred image and the specified frame of image according to the main object area and the background area so as to obtain a target merged image — S108

Generating a target video based on the target merged images respectively corresponding to the plurality of image groups — S110

Fig. 1

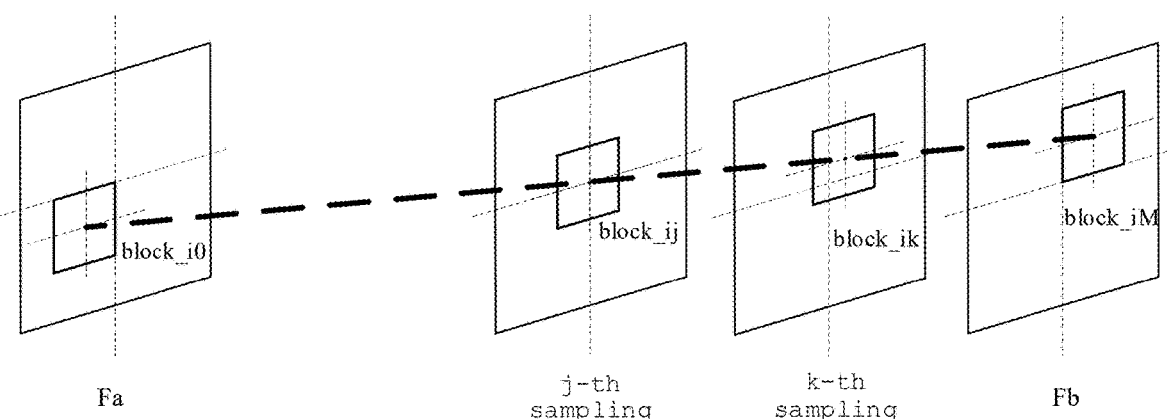

block_i0      block_ij      block_ik      block_iM

Fa      j-th sampling      k-th sampling      Fb

Fig. 2

VIDEO PROCESSING METHOD AND APPARATUS, AND DEVICE AND MEDIUM

CROSS-REFERENCE TO RELATED APPLICATIONS

This application is a U.S. National Stage under 35 U.S.C. § 371 of International Application No. PCT/CN2023/101608, as filed on Jun. 21, 2023, which is based on and claims the priority to the Chinese patent application No. 202210705983.3 filed on Jun. 21, 2022. The disclosure of each of these applications is incorporated herein in its entirety.

TECHNICAL FIELD

The present disclosure relates to the technical field of video processing, and particularly to a video processing method and apparatus, and a device and a medium.

BACKGROUND

In the field of video creation, a creator usually performs video shooting as needed. Different shooting modes result in different video effects. In some situations, the creator needs to shoot a video effect with a clear main object, a bokeh background, and a sense of lag. Such a video effect often requires slow-shutter shooting with the aid of a professional shooting tool and/or shooting by moving a lens, and also requires that the video creator has a perfect shooting skill and requires a suitable shooting scene.

SUMMARY

An embodiment of the present disclosure provides a video processing method, comprising: obtaining a plurality of image groups based on a video frame sequence of an initial video; performing motion blur processing based on respective frames of images in a target image group and merging images which are obtained by performing motion blur processing on the respective frames of images, so as to obtain a motion-blurred image corresponding to the target image group, wherein each image group among the plurality of image groups is the target image group; determining a main object area and a background area which correspond to the target image group based on a specified frame of image in the target image group; merging the motion-blurred image and the specified frame of image according to the main object area and the background area so as to obtain a target merged image, wherein an image part of the target merged image in the main object area corresponds to an image part of the specified frame of image in the main object area, and an image part of the target merged image in the background area is an image part of the motion-blurred image in the background area; and generating a target video based on the target merged images respectively corresponding to the plurality of image groups, wherein a sequence in which the target merged images respectively corresponding to the plurality of image groups are played in the target video is the same as a sequence in which the plurality of image groups are played in the initial video.

In some embodiments, the performing motion blur processing based on respective frames of images in a target image group and merging images which are obtained by performing motion blur processing on the respective frames of images comprises: interpolating a specified number of intermediate frames of images between adjacent frames of images in the target image group by using an optical flow interpolation algorithm, and taking all frames of images in the target image group after the frame interpolation as the images which are obtained by performing motion blur processing on the respective frames of images in the target image group; and performing average merging on the images which are obtained by performing motion blur processing on the respective frames of images.

In some embodiments, the interpolating a specified number of intermediate frames of images between adjacent frames of images in the target image group by using an optical flow interpolation algorithm comprises: obtaining a bidirectional motion vector of a pixel block between the adjacent frames of images in the target image group; and interpolating the specified number of intermediate frames of images between the adjacent frames of images according to the bidirectional motion vector of the pixel block and a block motion compensation algorithm.

In some embodiments, the obtaining a bidirectional motion vector of a pixel block between the adjacent frame of images in the target image group comprises: obtaining the bidirectional motion vector of the pixel block between the adjacent frames of images in the target image group based on an improved DIS optical flow algorithm, wherein a resolution of a bottom layer image of an image pyramid used in the improved DIS optical flow algorithm is less than a resolution of a bottom layer image of an image pyramid used in an original DIS optical flow algorithm, and/or, the number of iterations used in the improved DIS optical flow algorithm is less than the number of iterations used in the original DIS optical flow algorithm.

In some embodiments, the determining a main object area and a background area based on a specified frame of image in the target image group comprises: taking an image located in the middle of the target image group as the specified frame of image, processing the specified frame of image by using an object instance segmentation algorithm, and obtaining the main object area and the background area which correspond to the target image group based on a processing result.

In some embodiments, the merging the motion-blurred image and the specified frame of image according to the main object area and the background area comprises: obtaining a main object mask image according to the main object area and the background area; obtaining a weight coefficient corresponding to the main object mask image; adjusting pixel values of the main object mask image based on the weight coefficient so as to obtain the adjusted main object mask image; and merging the motion-blurred image and the specified frame of image based on the adjusted main object mask image.

In some embodiments, the obtaining a weight coefficient corresponding to the main object mask image comprises: obtaining a global motion amplitude corresponding to the respective frames of images in the target image group based on an optical flow method; and determining the weight coefficient corresponding to the main object mask image according to the global motion amplitude.

In some embodiments, the merging the motion-blurred image and the specified frame of image based on the adjusted main object mask image comprises: merging the motion-blurred image and the specified frame of image by using the following formula:

$$Merge\_N' = \beta * mask\_main * Pn + (1 - \beta * mask\_main) * Merge\_N$$

wherein β is the weight coefficient, mask_main is the main object mask image, β*mask_main is the adjusted main object mask image, Pn is the specified frame of image, Merge_N is the motion-blurred image, and Merge_N' is the target merged image.

In some embodiments, the obtaining a plurality of image groups based on a video frame sequence of an initial video comprises: segmenting the video frame sequence of the initial video according to a specified interval so as to obtain the plurality of image groups, wherein two adjacent image groups have a preset number of overlapping frames of images therebetween.

An embodiment of the present disclosure further provides a video processing apparatus, comprising: an image group obtaining module configured to obtain a plurality of image groups based on a video frame sequence of an initial video; a blur processing module configured to perform motion blur processing based on respective frames of images in a target image group and merge images which are obtained by performing motion blur processing on the respective frames of images, so as to obtain a motion-blurred image corresponding to the target image group, wherein each image group among the plurality of image groups is the target image group; an area determining module configured to determine a main object area and a background area which correspond to the target image group based on a specified frame of image in the target image group; a merging module configured to merge the motion-blurred image and the specified frame of image according to the main object area and the background area so as to obtain a target merged image, wherein an image part of the target merged image in the main object area corresponds to an image part of the specified frame of image in the main object area, and an image part of the target merged image in the background area is an image part of the motion-blurred image in the background area; and a video generating module configured to generate a target video based on the target merged images respectively corresponding to the plurality of image groups, wherein a sequence in which the target merged images respectively corresponding to the plurality of image groups are played in the target video is the same as a sequence in which the plurality of image groups are played in the initial video.

An embodiment of the present disclosure further provides an electronic device, comprising: a processor; and a memory configured to store instructions executable by the processor, wherein the processor is configured to read the executable instructions from the memory and execute the instructions to implement the video processing method according to the embodiment of the present disclosure.

An embodiment of the present disclosure further provides a computer-readable storage medium having stored thereon a computer program which, when executed by a processor, causes the processor to execute the video processing method according to the embodiment of the present disclosure.

An embodiment of the present disclosure further provides a computer program, comprising: instructions which, when executed by a processor, cause the processor to perform the video processing method according to the embodiment of the present disclosure.

It should be understood that the contents described in this section are not intended to identify key or critical features of the embodiments of the present disclosure, nor are they intended to limit the scope of the present disclosure. Other features of the present disclosure will become apparent from the following description.

BRIEF DESCRIPTION OF THE DRAWINGS

The accompanying drawings herein, which are incorporated in and constitute a part of this description, illustrate embodiments consistent with the present disclosure and, together with the description, serve to explain the principles of the present disclosure.

In order to more clearly illustrate technical solutions in the embodiments of the present disclosure or the related art, the drawings that need to be used in the description of the embodiments or the related art will be briefly described below, and it is apparent that for one of ordinary skill in the art, other drawings can be obtained according to these drawings without paying creative labor.

FIG. 1 is a schematic flow diagram of a video processing method according to an embodiment of the present disclosure;

FIG. 2 is a schematic diagram of frame interpolation between adjacent frames of images according to an embodiment of the present disclosure;

DETAILED DESCRIPTION

Figure 3:
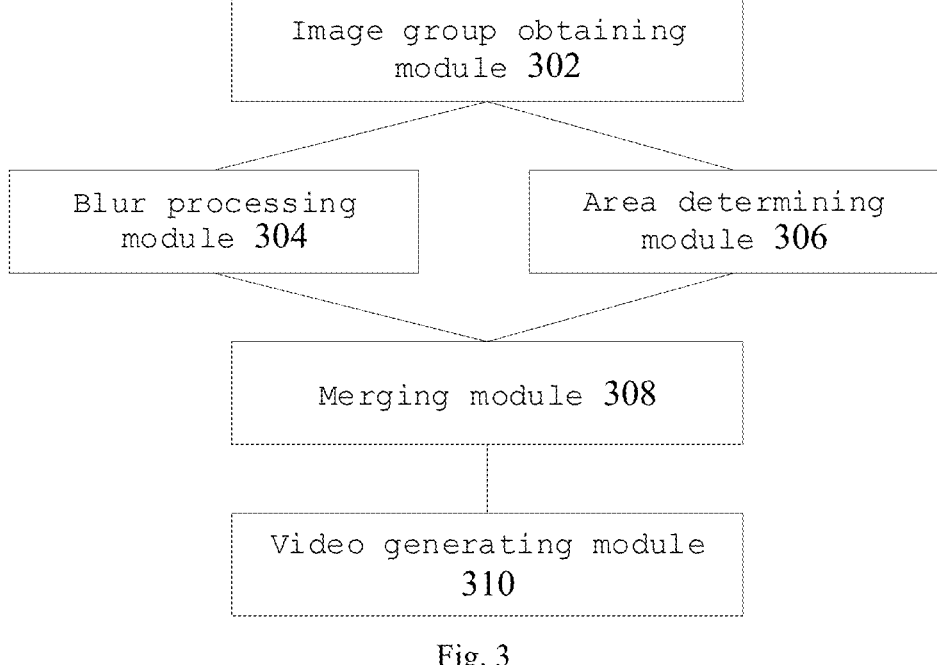
FIG. 3 is a schematic structural diagram of a video processing apparatus according to an embodiment of the present disclosure.

In order that the above objectives, features and advantages of the present disclosure may be more clearly understood, solutions of the present disclosure will be further described below. It should be noted that, without conflict, the embodiments of the present disclosure and the features in the embodiments may be combined with each other.

In the following description, numerous specific details are set forth to facilitate a thorough understanding of the present disclosure, but the present disclosure may be implemented in other ways different from those described herein; and it is apparent that the embodiments in the description are only part of the embodiments of the present disclosure, rather than all of them.

As described above, in order to obtain the video effect with a clear main object, a bokeh background, and a sense of lag, it often requires slow-shutter shooting with the aid of a professional shooting tool and/or shooting by moving a lens, and also requires that the video creator has a perfect shooting skill and requires a suitable shooting scene. Most video creators have difficulty in meeting the above shooting conditions, so that it is difficult to obtain the above video effect by shooting.

In order to obtain the video effect with a clear main object, a bokeh background, and a sense of lag, a professional shooting tool, a perfect shooting skill, and a suitable shooting scene are generally required. For example, a professional shooting stabilizer combined with a tripod is required for slow-shutter shooting, to obtain a bokeh background and a motion smear by means of slow shutter, thereby creating a hazy sense for a picture, and in the shooting process, professional adjustment of the slow shutter and use of reasonable exposure are also required to reach the required effect. In addition, if it is intended to obtain the above video effect by the shooting, there is a high requirement for the shooting scene, such as requiring that the shooting scene is at night or in poor light, otherwise, it is prone to overexposure in the case of adequate light.

In the related art, a motion smear is often generated by controlling a shooting frame rate and an exposure time, but this is limited by a shooting scene, only in a scene with poor light for shooting, so that it cannot be applied to all scenes. In addition, a main object in a video cannot be protected, and only the whole image can be smeared, making it difficult to ensure a clear main object. In addition, for personal shooting of a user, he often lacks a professional shooting stabilizer, so that the case of main object blurred often occurs due to hand-held shaking of the user.

In order to improve the above problem, embodiments of the present disclosure provide a video processing method and apparatus, and a device and a medium, capable of processing a normally shot video into a video with a clear main object portrait, a bokeh and blurred background, and a sense of lag by means of software processing, which are described in detail below.

FIG. 1 is a schematic flow diagram of a video processing method according to an embodiment of the present disclosure, and the method may be performed by a video processing apparatus, wherein the apparatus may be implemented by using software and/or hardware and may be generally integrated in an electronic device. As shown in FIG. 1, this method mainly comprises the following steps S102 to S110.

Step S102, obtaining a plurality of image groups based on a video frame sequence of an initial video.

The initial video may be a video shot without limitations of a shooting tool, a shooting skill, and a shooting scene, for example, it may be a video shot by a user by using only a mobile phone in any scene. The initial video can be a video shot in real time by the user or a pre-shot video uploaded by the user.

In some embodiments, the video frame sequence of the initial video may be segmented according to a specified interval, so as to obtain a plurality of image groups. In the embodiment of the present disclosure, the segmentation is not limited, which may be, for example, average segmentation (i.e., equal-interval segmentation), non-average segmentation, or cross segmentation (overlapping frames of images exist between adjacent image groups obtained by the cross segmentation). The specified interval may be a number interval, so that each image group may have therein the same number of frames of images, and contains N frames of images. The number of N may be flexibly set according to requirements, and exemplarily, it may be determined by referring to a frame rate of the initial video and a real frame rate of a required video. For example, the value N may be a ratio of the frame rate of the initial video to the real frame rate of the required video, and if the ratio is not an integer, an integer value closest to the ratio may be taken. In some embodiments, frames of images between two adjacent image groups are completely different. In some other embodiments, partial frames of images between two adjacent image groups are the same, that is, the partial frames of images overlap, in other words, two adjacent image groups have a preset number of overlapping frames of images therebetween. In this way, both rationality of the number of the image groups (that is, rationality of a frame rate of subsequently generated video) and an image merging effect of each image group in subsequent processing can be ensured. For ease of understanding, exemplary descriptions are made below.

Assuming that an original frame rate of the initial video is X fps, in order to generate a video with continuous lags, processing may be made by taking N frames of images as one group, to facilitate subsequently merging into one frame of image based on the N frames of images. For example, the real frame rate of the required video is 10 fps to 15 fps, and exemplarily, N=X/10 may be selected, that is, X/10 original frames are merged into one frame. Assuming that an original frame rate is 30 fps, 3 original frames are merged into one frame; an assuming that an original frame rate is 60 fps, 6 original frames are merged into one frame. The above is merely an example of selecting the value of N and should not be considered a limitation. For a video frame sequence of a video to be processed, it is assumed that Pi is an i-th frame of image. In some embodiments, P1-P6 are taken as one image group, P7-P12 are taken as one image group, P12-P17 are taken as one image group, . . . , and so on; the image groups thus obtained are usually small in number, and a finally generated video has a low frame rate, resulting in too noticeable lags; however, if the number of frames of images in the image group is reduced, for example, taking P1-P3 as one image group and P4-P6 as one image group, merging only 3 frames each time will result in a small degree of motion smear, making it difficult to observe an noticeable flowing effect. In order to achieve a better merging effect, in the embodiment of the present disclosure, the image frames may be multiplexed. Every 6 frames are still selected as one image group for processing, but adjacent image groups have overlapping frames therebetween, that is, P1~P6 are taken as one image group, P4~P9 as one image group, P7~P12 as one image group, P10~P15 as one image group, . . . and so on. That is, any two adjacent image groups have 3 overlapping frames of images therebetween, and by multiplexing the frames of images, the number of the image groups can be increased to 2 times while it is ensured that each image group contain 6 frames of images. Therefore, both rationality of the number of the image groups and the merging effect of the plurality of frames of images in each image group in the subsequent processing can be ensured, that is, a sense of bokeh and flowing motion of the whole picture is improved on the premise of ensuring the frame rate of the generated video.

Each image group is separately taken as a target image group, that is, for each image group, the following steps S104 to S108 are performed.

Step S104, performing motion blur processing based on respective frames of images in a target image group and merging images which are obtained by performing motion blur processing on the respective frames of images, so as to obtain a motion-blurred image corresponding to the target image group.

The motion blur processing is a post-processing mode of capturing a motion state effect of an object (a thing, animal or person, etc.), mainly for simulating a shooting technique for exposure when the object is moving. For example, an indirect exposure function of shooting a moving object in shooting is simulated, thereby making the image produce a dynamic effect, for example, producing an effect of the object sweeping cross or moving. For example, the motion blur processing is performed in a specified direction.

In the embodiment of the present disclosure, motion blur processing is performed based on the respective frames of images in the target image group, and all images which are obtained by performing motion blur processing are merged. For example, the images which are obtained by performing motion blur processing may not only include the processed original frames of images in the target image group, but also include frames of images additionally interpolated on the basis of the original frames of images during the motion blur processing. Finally, all the images are merged to obtain a motion-blurred image corresponding to the target image group. The motion-blurred image has a blur and bokeh picture effect.

In step S106, determining a main object area and a background area which correspond to the target image group based on a specified frame of image in the target image group.

The present disclosure does not limit the type of the main object, and the main object may be such as a person, an animal, or an article such as a vehicle.

In order to enable the main object part in the video to relatively clearly appear in the picture, an embodiment of the present disclosure provides an object protection strategy. For example, a specified frame of image may be selected from the target image group, wherein the specified frame of image can be, for example, a frame located in the middle of the target image group; by performing object segmentation on the specified frame of image, a main object area and a background area which correspond to the target image group can be finally obtained based on a segmentation result; and protection of the main object can be achieved subsequently by means of the main object area and the background area. For example, object segmentation may be performed on the specified frame of image (by taking an example that the main object is a person, then portrait segmentation is performed), so as to obtain a main object area and a background area in the specified frame of image, and the main object area and the background area in the specified frame of image are taken as the main object area and the background area which correspond to the target image group, wherein the background area is the area other than the main object area.

It should be noted that the above steps S104 and S106 are not in sequence and may be executed in parallel.

S108, merging the motion-blurred image and the specified frame of image according to the main object area and the background area so as to obtain a target merged image.

An image part of the target merged image in the main object area corresponds to an image part of the specified frame of image in the main object area, and an image part of the target merged image in the background area is an image part of the motion-blurred image in the background area. That is, the main object area in the target merged image is formed based on pixels of the main object area in the specified frame of image, and the background area in the target merged image is formed based on pixels of the background area in the motion-blurred image. In this way, the target merged image has both a blurred and bokeh background picture and a relatively clear main object.

For example, after the specified frame of image in the target image group is segmented into the main object area and the background area, the main object area and the background area may be distinguished in a specific mode. For example, based on the main object area and the background area, a main object mask image may be generated, which may identify different areas by using different pixel values. Exemplarily, pixel values of the background area in the main object mask image are all 0, and pixel values of the main object area are all 1; then the motion-blurred image and the specified frame of image are merged based on the main object mask image, so as to obtain a target merged image where the clear main object in the specified frame of image is combined with the blurred and bokeh background in the motion-blurred image.

Step S110, generating a target video based on the target merged images respectively corresponding to the plurality of image groups, wherein a sequence in which the target merged images respectively corresponding to the plurality of image groups are played in the target video is the same as a sequence in which the plurality of image groups are played in the initial video.

Each image group is separately taken as the target image group, and the above steps S104 to S108 are performed, so that each image group corresponds to one target merged image. All the target merged images are arranged according to the corresponding sequential position relationship of the plurality of image groups in the video frame sequence of the initial video, and each target merged image is taken as one frame of the target video, so that a video frame sequence of the target video can be formed after the plurality of target merged images are arranged in sequence. That is, the video frame sequence formed by the target merged images is the target video. The number of video frames contained in the target video is less than that of video frames in the initial video, and each frame of image in the target video is obtained by merging the plurality of frames of images in the initial video which are subjected to processing such as motion blur, main object protection, and the like. Therefore, the target video can bring a certain sense of lag to people, and the image picture has a blurred and bokeh background but a clear main object person.

In this way, a normally shot video can be processed into a video with an effect of a clear main object portrait, a bokeh background, and a sense of lag by using a software algorithm. This can make the user conveniently and quickly obtain the above video shooting effect without limitations of shooting tools, shooting skills, and shooting scenes.

According to the above technical solution provided in the embodiment of the present disclosure, a plurality of image groups may be obtained based on a video frame sequence of an initial video, and by separately taking each image group as a target image group, the following operations are performed: performing motion blur processing based on respective frames of images in the target image group and merging images which are obtained by performing motion blur processing on the respective frames of images, so as to obtain a motion-blurred image corresponding to the target image group; determining a main object area and a background area which correspond to the target image group based on a specified frame of image in the target image group; then merging the motion-blurred image and the specified frame of image according to the main object area and the background area, so as to obtain a target merged image; and finally, generating a target video based on the target merged images respectively corresponding to the plurality of image groups. In this way, a normally shot video can be processed into a video with an effect of a clear main object portrait, a bokeh background, and a sense of lag by using a software algorithm, which can make the user conveniently and quickly obtain the above video shooting effect without limitations of shooting tools, shooting skills, and shooting scenes.

In some embodiments, the step of performing motion blur processing based on respective frames of images in the target image group and merging images which are obtained by performing motion blur processing on the respective frames of images may be performed with reference to the following steps A to B.

Step A: interpolating a specified number of intermediate frames of images between adjacent frames of images (e.g., each pair of adjacent frames of images) in the target image group by using an optical flow interpolation algorithm, and taking all frames of images in the target image group after the frame interpolation as the images which are obtained by performing motion blur processing on the respective frames of images in the target image group.

An optical flow is "instantaneous velocity" of pixel motion of a spatially moving object on an observation imaging plane. The study of the optical flow is to determine "motion" of respective pixel positions by using temporal variation and correlation of pixel intensity data in an image sequence. In other words, in an optical flow algorithm, a pixel in one image is matched with a pixel in another image, so that it can be known from the matching, how the pixel "moves" or "flows" from the one image to the another. After each pixel is matched, an intermediate view between the two images can be interpolated by locally moving the pixel. In some embodiments, in order to save computing power and improve processing efficiency, frame interpolation may be performed by using a sparse optical flow interpolation method. For example, a frame of image is divided into pixel blocks (such as 16*16) of a specified size, and matching between pixel blocks and calculation of motion vectors are performed in a unit of the pixel block. Motion vectors corresponding to all pixels belonging to a same pixel block are the same, and motion vectors between different pixel blocks may be the same or different. In this way, computing power can be greatly saved. Both a server and a mobile terminal may perform video processing as described above directly. On this basis, in some implementation examples, the above step A may be performed with reference to the following steps A1 to A2.

Step A1: obtaining a bidirectional motion vector of a pixel block between the adjacent frames of images in the target image group.

For example, the bidirectional motion vector includes a forward motion vector and a backward motion vector. For example, adjacent frames of images are respectively a preceding frame of image Fa and a succeeding frame of image Fb, and taking Fa as a reference, a pixel block in the Fa is matched with that in the Fb, and the forward motion vector is calculated in a direction from the Fa to the Fb. Taking Fb as a reference, a pixel block in the Fb is matched with that in the Fa, and the backward motion vector is calculated in a direction from the Fb to the Fa. An optical flow motion trend of the pixel block between the images can be rationally and reliably characterized by means of the bidirectional motion vector.

In some embodiments, the bidirectional motion vector of the pixel block between adjacent frames of images in the target image group may be obtained based on an improved DIS optical flow algorithm.

For example, a resolution of a bottom layer image of an image pyramid used in the improved DIS optical flow algorithm is less than a resolution of a bottom layer image of an image pyramid used in an original DIS optical flow algorithm.

For example, the number of iterations used in the improved DIS optical flow algorithm is less than the number of iterations used in the original DIS optical flow algorithm. Exemplarily, the resolution of the bottom layer image of the image pyramid used in the original DIS optical flow algorithm is a resolution of an original image, and the resolution of the bottom layer image of the image pyramid used in the improved DIS optical flow algorithm is ¼ of the resolution of the original image; and the number of iterations of the original DIS optical flow algorithm is 12, while the number of iterations used in the improved DIS optical flow algorithm is 5.

The DIS optical flow algorithm is short for a dense inverse search-based method. The original DIS optical flow algorithm belongs to a dense optical flow algorithm, and in the embodiment of the present disclosure, in order to save computing power, improvement is made based on the original DIS optical flow algorithm. For example, the DIS algorithm is to zoom in/out an image to different scales to construct one image pyramid; and then, starting from a layer with minimum resolution, estimate an optical flow layer by layer downwards, wherein an optical flow estimated in each layer can be taken as initialization of estimation of a next layer, thereby achieving the purpose of accurately estimating motion with different amplitudes. In the embodiment of the present disclosure, however, there is only a need to obtain a sparse optical flow (i.e., pixels in each pixel block share one optical flow, rather than it needs to compute, for each pixel, a corresponding optical flow, wherein the optical flow may characterize a motion vector). Therefore, the DIS optical flow algorithm is improved, such that the resolution of the bottom layer image of the image pyramid (namely a highest resolution) is reduced. Exemplarily, the highest resolution is set to ¼ of the resolution of the original image. In addition, there is no need to perform a densification step on the highest resolution, and finally, the sparse optical flow can be obtained. In addition, since in the embodiment of the present disclosure, there is only the need to obtain a sparse optical flow, without the need of high accuracy, when gradient descent is used for solution, only the use of a small number of iterations is needed. Therefore, 12 iterations of the original DIS optical flow algorithm are changed to 5 iterations. After the DIS optical flow algorithm is improved, the bidirectional motion vector of the pixel block between the adjacent frames of images can be quickly obtained by using the improved DIS optical flow algorithm.

Step A2: interpolating the specified number of intermediate frames of images between the adjacent frames of images according to the bidirectional motion vector of the pixel block and a block motion compensation algorithm. The intermediate frames of images are images interpolated between the adjacent frames of images.

Motion compensation is a method of describing a difference between adjacent frames, for example, describing how each pixel block in the preceding frame of image moves step by step to a certain position in the succeeding frame of image. In the block motion compensation algorithm (also called divided block motion compensation), each frame of image is divided into several pixel blocks; and based on the pixel block in the original frame of image and the corresponding motion vector, its position in the intermediate frame of image can be predicted. For example, after the bidirectional motion vector of the pixel block between the adjacent frames of images is known, equidistant sampling can be performed on the pixel block of the adjacent frames of images M times respectively on a motion path; and one frame is interpolated every time the sampling is performed, wherein the sampling value M can characterize fineness of image merging. The greater the value M, the more natural the image merging, and the less the value M, the coarser the image merging, making it easy to appear apparent overlapping signs. Frame interpolation is performed by block motion compensation to obtain a blur effect image between the adjacent frames. For convenience of understanding, referring to a schematic diagram of frame interpolation between adjacent frames of images shown in FIG. 2, Fa and Fb are adjacent frames, and for any pixel block_i in the frame Fa, corresponding block_i0 and block_iM are found in the preceding and succeeding frames; and equidistance sampling is performed on the corresponding motion path M times respectively by the bidirectional motion vector (the forward motion vector F_ab and the backward motion vector F_ba) of the pixel block, and one frame is interpolated every time the sampling is performed. Exemplarily, pixel block positions at the j-th sampling and the k-th sampling are shown in FIG. 2, which shows that the pixel block corresponding to the j-th sampling is block_ij, and the pixel block corresponding to the k-th sampling is block_ik. As shown in FIG. 2, each pixel is copied and superimposed on a motion path of a pixel block to which it belongs, thereby producing a realistic and smooth motion blur effect. In the above manner, a plurality of intermediate frames of images can be interpolated between the adjacent frames of images by sampling many times, and the intermediate frames of images all are blurred images.

Step B: performing average merging on the images which are obtained by performing motion blur processing on the respective frames of images.

Pixel values of all the images (the original adjacent image frames and the interpolated intermediate frames of images) which are obtained by performing motion blur processing are averaged to obtain the motion-blurred image corresponding to the target image group. This enables the final motion-blurred image to simulate an indirect exposure function of shooting a moving object in shooting, making the image produce a dynamic effect of a motion bokeh. In addition, based on the processing mode of the pixel block, the required computing power can also be reduced on the premise of ensuring the image merging effect, effectively improving the overall algorithm performance and ensuring feasibility of implementation of a mobile terminal.

In this way, the motion-blurred images can be correspondingly generated based on the frames of images in each image group, and a blur degree of the motion-blurred image is generally proportional to a motion degree, wherein the faster the motion, the longer the smear. The implementation principle and the achievable effect by using the above algorithm are consistent with the principle of a real slow shutter and the shot blur degree. Therefore, both of them have one problem: when the user wants a blurred motion in the picture background and a relatively clear main object, the blur processing algorithm used above or the real shooting effect cannot avoid main object blur caused by main object motion or shaking of a shooting device. In other words, the main object in the motion-blurred image obtained by the motion-blurred processing method provided in the embodiment of the present disclosure is also blurred, making it difficult to be clearly presented to the user. In order to improve this problem, an embodiment of the present disclosure provides an object protection strategy, which may perform object segmentation based on a specified frame of image in the target image group, so as to obtain a main object area and a background area which correspond to the target image group; and object protection is made by means of the main object area and the background area. For example, for the specified frame of image, an image located in the middle of the target image group may be selected, helping the subsequent merging to be more natural.

In some embodiments, an image located in the middle of the target image group is taken as the specified frame of image, the specified frame of image is processed by using an object instance segmentation algorithm, and a main object area and a background area, which correspond to the target image group, are obtained based on a processing result. For example, a main object mask image may be obtained according to the main object area and the background area. In some embodiments, there may be at least one object in the specified frame of image, then a main object mask may be determined from at least one object mask. The main object mask is an object mask closest to a center of the image, and therefore the main object mask image is obtained.

In some embodiments for determining the main object mask image, reference may also be made to the following steps 1 to 4.

Step 1, performing image erosion on the object segmentation result (Alpha segmentation image) of the specified frame of image to reduce connectivity between a plurality of objects.

Step 2, binarizing the image after the erosion, and then performing connected area detection to find out a large connected area closest to the center of the image as a main object.

Step 3, performing an expansion operation on the selected connected area, and mapping it to the original Alpha segmentation image, so as to obtain a main object mask.

Step 4, optimizing the main object mask, exemplarily, performing mean blurring and edge smoothing processing, so as to obtain the main object mask image.

In the above manner, the main object mask image can be obtained to facilitate subsequent protection of the main object by using the main object mask image.

It should be noted that, in the embodiment of the present disclosure, the two processes of obtaining the motion-blurred image corresponding to the target image group and the main object mask image are not in sequence, and may be executed in parallel.

After the motion-blurred image and the main object mask image are obtained in the above manner, in some embodiments, a target merged image corresponding to the target image group may be obtained according to the motion-blurred image, the main object mask image, and the specified frame of image.

In order to make the frame of image picture of the obtained target video more realistic, in the embodiment of the present disclosure, the degree of protection of the main object can also be controlled. For example, in the case of a large global motion amplitude, the main object will not be particularly clear to avoid a sense of incongruity. On this basis, the step of performing image merging on the motion-blurred image and the specified frame of image according to the main object mask image, can refer to the following steps (1) to (3).

In step (1), a weight coefficient corresponding to the main object mask image is obtained. The weight coefficient is related to the protection degree of the main object, and the larger the weight coefficient, the higher the protection degree of the main object, and the clearer the main object.

In some implementation examples, a global motion amplitude corresponding to respective frames of images in the target image group may be obtained based on an optical flow method; and a weight coefficient corresponding to the main object mask image is determined according to the global motion amplitude. In the embodiment of the present disclosure, the optical flow method is not limited, for example, motion information of the pixel block may be determined by using a sparse optical flow method, thereby obtaining the global motion amplitude corresponding to respective frames of images in the target image group. The global motion amplitude is negatively correlated with the weight coefficient, and the larger the global motion amplitude, the faster the motion, the smaller the weight coefficient, the relatively lower the sharpness of the main object (but still higher than the sharpness of the blurred background, only making the main object not particularly sharp). In summary, in the embodiment of the present disclosure, the degree of object protection may be adjusted according to the global motion amplitude caused by lens movement.

In step (2), a pixel value of the main object mask image is adjusted based on the weight coefficient, so as to obtain an adjusted main object mask image. In some examples, the weight coefficient may be multiplied by the pixel value of the main object mask image to obtain the adjusted main object mask image.

In step (3), image merging is performed on the motion-blurred image and the specified frame of image based on the adjusted main object mask image. Exemplarily, image merging can be performed on the motion-blurred image and the specified frame of image by using the following formula:

$$\text{Merge\_N}' = \beta * \text{mask\_main} * Pn + (1 - \beta * \text{mask\_main}) * \text{Merge\_N}$$

where β is the weight coefficient; mask_main is the main object mask image; β*mask_main is the adjusted main object mask image; Pn is the specified frame of image; Merge_N is the motion-blurred image; and Merge_N' is the target merged image.

The target merged image obtained by performing image merging based on the above formula has a blurred and bokeh background picture, but a relatively clear main object, and a sharpness degree adjustable based on the weight coefficient; and the weight coefficient can be determined based on the global motion amplitude caused by lens movement, so that the sharpness degree of the main object is correlated with the global motion amplitude, and the picture effect is more realistic and natural.

After the corresponding target merged images are obtained in the above manner for the image groups which are obtained by segmentation (average segmentation, non-average segmentation, cross segmentation, and the like, the segmentation being not limited) of the video frame sequence of the initial video, all the target merged images can be arranged in sequence to form the required target video. And because the plurality of frames of images of the initial video are merged into one frame of image in the target video, the frame rate is reduced, and therefore a sense of lag can be brought to the user. In summary, the user can conveniently and quickly convert a video normally shot by the user into a target video with a clear main object, a bokeh background, and a sense of lag by using a software algorithm, without limitations of shooting tools, shooting skills, and shooting scenes, and only with the aid of the video processing method provided by the embodiment of the present disclosure. The above target video has a unique style, and can present the user with a video picture with a sense of motion and a sense of lag, but a main object in the video picture is still clear, so that the main object can be well highlighted. Taking an example that the main object is a person, the above video effect can embody the inner consciousness of the main object person to a certain extent and has strong infectivity. In addition, by performing motion blur during the processing by using a sparse optical flow algorithm and the like, the computing power can be effectively reduced, the performance of the overall algorithm can be improved, and the feasibility of implementation of a mobile terminal can be ensured. Therefore, it can be implemented on both a server and a mobile terminal, with a wider application range.

Figure 4:
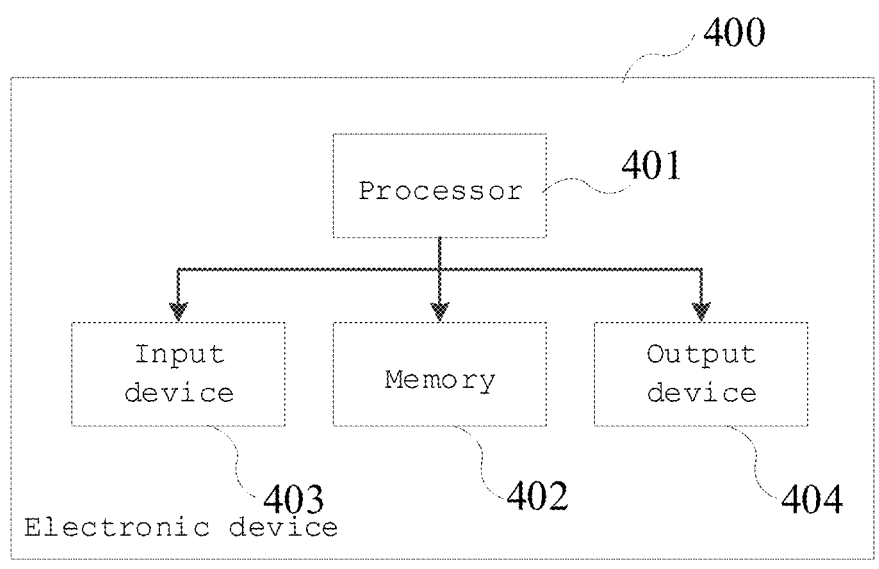
FIG. 4 is a schematic structural diagram of an electronic device according to an embodiment of the present disclosure.

Corresponding to the foregoing video processing method, an embodiment of the present disclosure provides a video processing apparatus. FIG. 3 is a schematic structural diagram of a video processing apparatus according to an embodiment of the present disclosure. The apparatus may be implemented by software and/or hardware, and may be generally integrated in an electronic device, as shown in FIG. 4.

The video processing apparatus comprises: an image group obtaining module 302, configured to obtain a plurality of image groups based on a video frame sequence of an initial video;

a blur processing module 304, configured to perform motion blur processing based on respective frames of images in a target image group and merge images which are obtained by performing motion blur processing on the respective frames of images, so as to obtain a motion-blurred image corresponding to the target image group, wherein each image group among the plurality of image groups is the target image group;

an area determining module 306, configured to determine a main object area and a background area which correspond to the target image group based on a specified frame of image in the target image group;

a merging module 308, configured to merge the motion-blurred image and the specified frame of image according to the main object area and the background area so as to obtain a target merged image, wherein an image part of the target merged image in the main object area corresponds to an image part of the specified frame of image in the main object area, and an image part of the target merged image in the background area is an image part of the motion-blurred image in the background area; and a video generating module 310, configured to generate a target video based on the target merged images respectively corresponding to the plurality of image groups, wherein a sequence in which the target merged images respectively corresponding to the plurality of image groups are played in the target video is the same as a sequence in which the plurality of image groups are played in the initial video.

By the above apparatus, a normally shot video can be processed into a video with an effect of a clear main object portrait, a bokeh background, and a sense of lag by using a software algorithm, which can make a user conveniently and quickly obtain the above video shooting effect without limitations of shooting tools, shooting skills, and shooting scenes.

In some implementations, the blur processing module 304 is configured to: interpolate a specified number of intermediate frames of images between adjacent frames of images in the target image group by using an optical flow interpolation algorithm, and take all frames of images in the target image group after the frame interpolation as the images which are obtained by performing motion blur processing on the respective frames of images in the target image group; and perform average merging on the images which are obtained by performing motion blur processing on the respective frames of images.

In some implementations, the blur processing module 304 is configured to: obtain a bidirectional motion vector of a pixel block between the adjacent frames of images in the target image group; and interpolate the specified number of intermediate frames of images between the adjacent frames of images according to the bidirectional motion vector of the pixel block and a block motion compensation algorithm.

In some implementations, the blur processing module 304 is configured to: obtain the bidirectional motion vector of the pixel block between the adjacent frames of images in the target image group based on an improved DIS optical flow algorithm; wherein a resolution of a bottom layer image of an image pyramid used in the improved DIS optical flow algorithm is less than a resolution of a bottom layer image of an image pyramid used in an original DIS optical flow algorithm, and/or, the number of iterations used in the improved DIS optical flow algorithm is less than the number of iterations used in the original DIS optical flow algorithm.

In some embodiments, the area determining module 306 is configured to: take an image located in the middle of the target image group as the specified frame of image, process the specified frame of image by using an object instance segmentation algorithm, and obtain the main object area and the background area which correspond to the target image group based on a processing result.

In some embodiments, the merging module 308 is configured to: obtain a main object mask image according to the main object area and the background area; obtain a weight coefficient corresponding to the main object mask image; adjust pixel values of the main object mask image based on the weight coefficient so as to obtain the adjusted main object mask image; and merging the motion-blurred image and the specified frame of image based on the adjusted main object mask image.

In some embodiments, the merging module 308 is configured to: obtain a global motion amplitude corresponding to the respective frames of images in the target image group based on an optical flow method; and determine the weight coefficient corresponding to the main object mask image according to the global motion amplitude.

In some embodiments, the merging module 308 is configured to: merge the motion-blurred image and the specified frame of image based on the adjusted main object mask image, which comprises:

merging the motion-blurred image and the specified frame of image by using the following formula:

$$\mathrm{Merge\_N'} = \beta * \mathrm{mask\_main} * Pn + (1 - \beta * \mathrm{mask\_main}) * \mathrm{Merge\_N},$$

wherein β is the weight coefficient, mask_main is the main object mask image, β*mask_main is the adjusted main object mask image, Pn is the specified frame of image, Merge_N is the motion-blurred image, and Merge_N' is the target merged image.

In some embodiments, the image group obtaining module 302 is configured to: segment the video frame sequence of the initial video according to a specified interval so as to obtain the plurality of image groups, wherein two adjacent image groups have a preset number of overlapping frames of images therebetween.

The video processing apparatus provided in the embodiment of the present disclosure can execute the video processing method provided in any embodiment of the present disclosure, and has functional modules and beneficial effects corresponding to the execution of the method.

It can be clearly understood by those skilled in the art that, for convenience and simplicity of description, for the working process of the apparatus embodiment described above, reference may be made to the corresponding process in the method embodiment, which is not repeated here.

An embodiment of the present disclosure further provides an electronic device, comprising: a processor; and a memory configured to store instructions executable by the processor, wherein the processor is configured to read the executable instructions from the memory and execute the instructions to implement the above video processing method. FIG. 4 is a schematic structural diagram of an electronic device according to an embodiment of the present disclosure. As shown in FIG. 4, an electronic device 400 includes one or more processors 401 and a memory 402.

The processor 401 may be a central processing unit (CPU) or other form of processing unit with data processing capabilities and/or instruction execution capabilities, and may control other components in the electronic device 400 to perform desired functions.

The memory 402 may include one or more computer program products, which may include various forms of computer-readable storage medium, such as a volatile memory and/or non-volatile memory. The volatile memory may include, for example, a random access memory (RAM), and/or a cache or the like. The non-volatile memory may include, for example, a read only memory (ROM), hard disk, flash memory, etc. On the computer-readable storage medium, one or more computer program instructions may be stored, which can be executed by the processor 401 to implement the above video processing method of the embodiment of the present disclosure and/or other desired functions. In the computer-readable storage medium, various content such as an input signal, a signal component, a noise component, and the like may also be stored.

In some examples, the electronic device 400 may also include: an input device 403 and an output device 404, which are interconnected by a bus system and/or other form of connection mechanism (not shown).

In addition, the input device 403 may also include, for example, a keyboard, a mouse, and the like.

The output device 404 may output various information to the outside, including determined distance information, direction information, and the like. The output means 404 may include, for example, a display, speaker, printer, communication network and its connected remote output device, and the like.

Of course, for simplicity, in FIG. 4, only some of the components in the electronic device 400 that are related to the present disclosure are shown, and components such as buses, and input/output interfaces are omitted. In addition, the electronic device 400 may also include any other suitable components according to a specific application.

In addition to the above method and apparatus, an embodiment of the present disclosure may also be a computer program product comprising computer program instructions which, when executed by a processor, cause the processor to perform the video processing method according to the embodiment of the present disclosure.

For the computer program product, program codes for performing operations of the embodiments of the present disclosure may be written in any combination of one or more programming languages, including an object-oriented programming language such as Java, C++, and the like, and also including a conventional procedural programming language, such as a "C" language or similar programming language. The program codes may be executed entirely on a user's computing device, partly on the user's computing device, as a stand-alone software package, partly on the user's computing device and partly on a remote computing device, or entirely on the remote computing device or server.

Furthermore, an embodiment of the present disclosure may also be a computer-readable storage medium having stored thereon computer program instructions which, when executed by a processor, cause the processor to perform the video processing method according to the embodiment of the present disclosure.

The computer-readable storage medium may take any combination of one or more readable medium. The readable medium may be a readable signal medium or a readable storage medium. The readable storage medium may include, for example, but is not limited to, an electronic, magnetic, optical, electromagnetic, infrared, or semiconductor system, apparatus, or device, or a combination of any of the foregoing. Examples (a non-exhaustive list) of the readable storage medium include: an electrical connection having one or more wires, a portable diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

An embodiment of the present disclosure further provides a computer program product comprising a computer program/instructions which, when executed by a processor, implement(s) the video processing method in the embodiment of the present disclosure.

An embodiment of the present disclosure further provides a computer program comprising instructions which, when executed by a processor, cause the processor to perform the video processing method according to the embodiment of the present disclosure.

It should be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device comprising a list of elements not only includes those elements but also includes other elements not expressly listed, or also includes elements inherent to such a process, method, article, or device. Without more limitations, an element defined by a statement "comprising a . . . " does not exclude the presence of another identical element in a process, method, article, or device that includes the element.

The above only describes the specific implementations of the present disclosure, to enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments described herein, but conform to the widest scope consistent with the principles and novel features disclosed herein.

What is claimed is:

1. A video processing method, comprising:

obtaining a plurality of image groups based on a video frame sequence of an initial video;

performing, for each target image group among the plurality of image groups, following operations:

performing motion blur processing based on frame images in the target image group, so as to obtain a motion-blurred image corresponding to the target image group;

determining, by using an object instance segmentation algorithm, a main object area and a background area of a certain frame image in the target image group; and merging the motion-blurred image and the certain frame image according to the main object area and the background area so as to obtain a target merged image corresponding to the target image group, wherein an image part of the target merged image in the main object area corresponds to an image part of the certain frame image in the main object area, and an image part of the target merged image in the background area corresponds to an image part of the motion-blurred image in the background area; and generating a target video based on the target merged images respectively corresponding to the plurality of image groups, wherein a sequence in which the target merged images respectively corresponding to the plurality of image groups are played in the target video is the same as a sequence in which the plurality of image groups are played in the initial video, wherein performing the motion blur processing based on the frame images in the target image group, so as to obtain the motion-blurred image corresponding to the target image group comprises:

interpolating a certain number of intermediate frame images between adjacent frame images in the target image group by using an optical flow interpolation algorithm, and performing average merging on all image frames in the target image group after the frame interpolation, so as to obtain the motion-blurred image corresponding to the target image group.

2. The video processing method according to claim 1, wherein interpolating the certain number of intermediate frame images between the adjacent frame images in the target image group by using the optical flow interpolation algorithm comprises:

obtaining a bidirectional motion vector of a pixel block between the adjacent frame images in the target image group; and interpolating the certain number of intermediate frame images between the adjacent frame images according to the bidirectional motion vector of the pixel block and a block motion compensation algorithm.

3. The video processing method according to claim 2, wherein obtaining the bidirectional motion vector of the pixel block between the adjacent frame images in the target image group comprises:

obtaining the bidirectional motion vector of the pixel block between the adjacent frame images in the target image group based on an improved dense inverse search (DIS) optical flow algorithm, wherein at least one of the following is met: a resolution of a bottom layer image of an image pyramid used in the improved DIS optical flow algorithm is less than a resolution of a bottom layer image of an image pyramid used in an original DIS optical flow algorithm, or, a number of iterations used in the improved DIS optical flow algorithm is less than a number of iterations used in the original DIS optical flow algorithm.

4. The video processing method according to claim 1, wherein determining the main object area and the background area of the certain frame image in the target image group comprises:

taking an image located in the middle of the target image group as the certain frame image;

processing the certain frame image by using the object instance segmentation algorithm; and obtaining the main object area and the background area of the certain frame image based on a processing result.

5. The video processing method according to claim 1, wherein merging the motion-blurred image and the certain frame image according to the main object area and the background area comprises:

obtaining a main object mask image according to the main object area and the background area;

obtaining a weight coefficient corresponding to the main object mask image;

adjusting pixel values of the main object mask image based on the weight coefficient so as to obtain the adjusted main object mask image; and merging the motion-blurred image and the certain frame image based on the adjusted main object mask image.

6. The video processing method according to claim 5, wherein obtaining the weight coefficient corresponding to the main object mask image comprises:

obtaining a global motion amplitude corresponding to the frame images in the target image group based on an optical flow method; and determining the weight coefficient corresponding to the main object mask image according to the global motion amplitude.

7. The video processing method of claim 6, wherein the global motion magnitude is negatively correlated with the weight coefficient.

8. The video processing method according to claim 5, wherein merging the motion-blurred image and the certain frame image based on the adjusted main object mask image comprises:

merging the motion-blurred image and the certain frame image by using the following formula:

$$\text{Merge\_N}' = \beta * \text{mask\_main} * Pn + (1 - \beta * \text{mask\_main}) * \text{Merge\_N},$$

wherein $\beta$ is the weight coefficient, mask_main is the main object mask image, $\beta$*mask_main is the adjusted main object mask image, Pn is the certain frame image, Merge_N is the motion-blurred image, and Merge_N' is the target merged image.

9. The video processing method according to claim 1, wherein obtaining the plurality of image groups based on the video frame sequence of the initial video comprises:

segmenting the video frame sequence of the initial video according to a certain interval so as to obtain the plurality of image groups, wherein two adjacent image groups have a preset number of overlapping frame images therebetween.

10. An electronic device, comprising:

a processor; and a memory configured to store instructions executable by the processor, wherein the processor is configured to read the executable instructions from the memory and execute the instructions to implement following video processing operations:

obtaining a plurality of image groups based on a video frame sequence of an initial video;

performing, for each target image group among the plurality of image groups, following operations:

performing motion blur processing based on frame images in the target image group, so as to obtain a motion-blurred image corresponding to the target image group;

determining, by using an object instance segmentation algorithm, a main object area and a background area of a certain frame image in the target image group; and merging the motion-blurred image and the certain frame image according to the main object area and the background area so as to obtain a target merged image corresponding to the target image group, wherein an image part of the target merged image in the main object area corresponds to an image part of the certain frame image in the main object area, and an image part of the target merged image in the background area corresponds to an image part of the motion-blurred image in the background area; and generating a target video based on the target merged images respectively corresponding to the plurality of image groups, wherein a sequence in which the target merged images respectively corresponding to the plurality of image groups are played in the target video is the same as a sequence in which the plurality of image groups are played in the initial video, wherein performing the motion blur processing based on the frame images in the target image group, so as to obtain the motion-blurred image corresponding to the target image group comprises:

interpolating a certain number of intermediate frame images between adjacent frame images in the target image group by using an optical flow interpolation algorithm, and performing average merging on all image frames in the target image group after the frame interpolation, so as to obtain the motion-blurred image corresponding to the target image group.

11. The electronic device according to claim 10, wherein interpolating the certain number of intermediate frame images between the adjacent frame images in the target image group by using the optical flow interpolation algorithm comprises:

obtaining a bidirectional motion vector of a pixel block between the adjacent frame images in the target image group; and interpolating the certain number of intermediate frame images between the adjacent frame images according to the bidirectional motion vector of the pixel block and a block motion compensation algorithm.

12. The electronic device according to claim 11, wherein obtaining the bidirectional motion vector of the pixel block between the adjacent frame images in the target image group comprises:

obtaining the bidirectional motion vector of the pixel block between the adjacent frame images in the target image group based on an improved dense inverse search (DIS) optical flow algorithm, wherein at least one of the following is met: a resolution of a bottom layer image of an image pyramid used in the improved DIS optical flow algorithm is less than a resolution of a bottom layer image of an image pyramid used in an original DIS optical flow algorithm, or, a number of iterations used in the improved DIS optical flow algorithm is less than a number of iterations used in the original DIS optical flow algorithm.

13. The electronic device according to claim 10, wherein determining the main object area and the background area of the certain frame image in the target image group comprises:

taking an image located in the middle of the target image group as the certain frame image;

processing the certain frame image by using the object instance segmentation algorithm; and obtaining the main object area and the background area of the certain frame image based on a processing result.

14. A non-transitory computer-readable storage medium having stored thereon a computer program which, when executed by a processor, causes the processor to perform following video processing operations:

obtaining a plurality of image groups based on a video frame sequence of an initial video;

performing, for each target image group among the plurality of image groups, following operations:

performing motion blur processing based on frame images in a target image group, so as to obtain a motion-blurred image corresponding to the target image group;

determining, by using an object instance segmentation algorithm, a main object area and a background area of a certain frame image in the target image group; and merging the motion-blurred image and the certain frame image according to the main object area and the background area so as to obtain a target merged image corresponding to the target image group, wherein an image part of the target merged image in the main object area corresponds to an image part of the certain frame image in the main object area, and an image part of the target merged image in the background area corresponds to an image part of the motion-blurred image in the background area; and generating a target video based on the target merged images respectively corresponding to the plurality of image groups, wherein a sequence in which the target merged images respectively corresponding to the plurality of image groups are played in the target video is the same as a sequence in which the plurality of image groups are played in the initial video, wherein performing the motion blur processing based on the frame images in the target image group, so as to obtain the motion-blurred image corresponding to the target image group comprises:

interpolating a certain number of intermediate frame images between adjacent frame images in the target image group by using an optical flow interpolation algorithm, and performing average merging on all image frames in the target image group after the frame interpolation, so as to obtain the motion-blurred image corresponding to the target image group.

15. The storage medium according to claim 14, wherein interpolating the certain number of intermediate frame images between the adjacent frame images in the target image group by using the optical flow interpolation algorithm comprises:

obtaining a bidirectional motion vector of a pixel block between the adjacent frame images in the target image group; and interpolating the certain number of intermediate frame images between the adjacent frame images according to the bidirectional motion vector of the pixel block and a block motion compensation algorithm.

16. The storage medium according to claim 15, wherein obtaining the bidirectional motion vector of the pixel block between the adjacent frame images in the target image group comprises:

obtaining the bidirectional motion vector of the pixel block between the adjacent frame images in the target image group based on an improved dense inverse search (DIS) optical flow algorithm, wherein at least one of the following is met: a resolution of a bottom layer image of an image pyramid used in the improved DIS optical flow algorithm is less than a resolution of a bottom layer image of an image pyramid used in an original DIS optical flow algorithm, or, a number of iterations used in the improved DIS optical flow algorithm is less than a number of iterations used in the original DIS optical flow algorithm.

17. The storage medium according to claim 14, wherein determining the main object area and the background area of the certain frame image in the target image group comprises:

taking an image located in the middle of the target image group as the certain frame image;

processing the certain frame image by using the object instance segmentation algorithm; and obtaining the main object area and the background area of the certain frame image based on a processing result.

* * * * *